United States Patent
Strzala

(10) Patent No.: US 11,835,101 B2
(45) Date of Patent: Dec. 5, 2023

(54) AIR BRAKE WITH SPRING SUPPORT

(71) Applicant: ZF CV Systems Europe BV, Brussels (BE)

(72) Inventor: Wieslaw Strzala, Byczyna (PL)

(73) Assignee: ZF CV Systems Europe BV, Brussels (BE)

( * ) Notice: Subject to any disclaimer, the term of this patent is extended or adjusted under 35 U.S.C. 154(b) by 96 days.

(21) Appl. No.: 17/513,260

(22) Filed: Oct. 28, 2021

(65) Prior Publication Data
US 2022/0136578 A1   May 5, 2022

(30) Foreign Application Priority Data
Oct. 29, 2020   (EP) .................................... 20204617

(51) Int. Cl.
*F16D 65/097*  (2006.01)
*F16D 65/00*   (2006.01)
*F16D 55/00*   (2006.01)

(52) U.S. Cl.
CPC ..... *F16D 65/0978* (2013.01); *F16D 65/0068* (2013.01); *F16D 2055/0016* (2013.01); *F16D 2250/0084* (2013.01)

(58) Field of Classification Search
CPC ............. F16D 65/0068; F16D 65/0978; F16D 2055/0016; F16D 2250/0084
USPC ........................................... 188/73.36–73.38
See application file for complete search history.

(56) References Cited

U.S. PATENT DOCUMENTS

| | | | |
|---|---|---|---|
| 6,354,407 B1 | 12/2002 | Heinlein et al. | |
| 8,276,718 B2 * | 10/2012 | Bach | F16D 55/226 188/73.43 |
| 8,671,604 B2 * | 3/2014 | Mallmann | F16D 65/0081 40/643 |
| 2016/0116009 A1 * | 4/2016 | Falter | F16D 65/0978 188/73.38 |
| 2016/0123415 A1 * | 5/2016 | Brandl | F16D 65/0006 188/73.37 |
| 2016/0146278 A1 * | 5/2016 | Roberts | F16D 55/226 188/73.38 |
| 2020/0141458 A1 * | 5/2020 | Goyke | F16D 65/0068 |

FOREIGN PATENT DOCUMENTS

| | | |
|---|---|---|
| DE | 202006021291 U1 | 12/2014 |
| DE | 102017108175 A1 | 10/2018 |

* cited by examiner

*Primary Examiner* — Christopher P Schwartz
(74) *Attorney, Agent, or Firm* — Dickinson Wright PLLC

(57) ABSTRACT

An air brake (100) includes a brake caliper (40, 41), at least one leaf spring (44, 45), and a spring support (30*a-e*). The spring support is pushed into a recess (42) of the brake caliper during assembly prior to being fixed to the brake caliper. The spring support (30*a*) includes a visual indicator in the form of a marking (38*a*) or the brake caliper includes a visual indicator in the form of an incision. The visual indicator is arranged to indicate the correct depth of insertion of the spring support into the brake caliper.

15 Claims, 3 Drawing Sheets

AIR BRAKE WITH SPRING SUPPORT

FIELD

The invention relates to an air brake having a brake caliper and a spring support for fixing brake linings, as used, for example, in heavy goods vehicles or trailer vehicles.

BACKGROUND

A spring support 10 for fixing brake linings is illustrated in FIG. 1. The spring support 10 has an end 12, by way of which the spring 10 is pushed during assembly into a recess of a brake caliper, and an opposing end 14 having a hole 16, by way of which the spring 10 is screwed to the brake caliper.

The assembly of the spring support 10 in a brake caliper 20 is illustrated in FIG. 2. The spring support 10 is first pushed with the end 12 into a recess 22 of the brake caliper 20 and subsequently pressed onto the brake caliper 20 until it is positioned on the brake caliper 20. In this instance, two leaf springs 24, 25 are pressed down and thereby apply a pressure to two brake linings 26, 27 in order to fix the brake linings 26, 27. Subsequently, the spring support 10 is screwed to the brake caliper 20 with a screw 28, as illustrated in FIG. 3.

The recess 22 is deeper than necessary in order to compensate for tolerances. It may therefore be the case that the spring support 10 is pushed too deep into the recess 22 during assembly. The end 14 of the spring support 10 therefore collides with a border 29 of the brake caliper 20 and therefore cannot be screwed to the brake caliper 20, as illustrated in FIG. 4. In this instance, additional assembly steps for correcting the position of the spring support 10 are necessary, which lead to increased production costs.

Accordingly, there is a need for an air brake having a brake caliper and a spring support having lower assembly costs.

SUMMARY

An object of the invention is therefore to provide an air brake with a brake caliper and a spring support which has a simplified assembly and thereby lower costs.

This object is achieved with an air brake having a brake caliper with a spring support, where the brake caliper includes a visual indicator on the spring support or the brake caliper for indicating the proper depth of insertion of the spring support. A utility vehicle having the air brake is also provided herein.

Additional advantageous developments and improvements of the invention according to the following description is further provided herein.

The present disclosure relates to an air brake which has a brake caliper, at least one leaf spring, and a spring support. The spring support is pushed into a recess of the brake caliper during assembly of the spring support prior to being screwed to the brake caliper. The spring support or the brake caliper may include a visual indicator for adjusting the spring support. In one aspect, the spring support includes a marking for adjusting the spring support. In another aspect, the brake caliper includes an incision for adjusting the spring support.

In an advantageous embodiment, the marking of the spring support or the incision of the brake caliper indicates how deep the spring support is intended to be pushed into the recess of the brake caliper during assembly of the spring support.

In a preferred embodiment, the marking is in the form of an indentation or a recess.

In another preferred embodiment, the marking is in the form of a sticker or a colored marking.

In another preferred embodiment, the marking is in the form of a hole.

In another preferred embodiment, the marking is in the form of an incision.

In another advantageous embodiment, the marking has a spacing from the end of the spring support that is intended to be pushed into the recess of the brake caliper during assembly, and the spacing is equal to the length by which the spring support is intended to be pushed into the recess of the brake caliper.

In another advantageous embodiment, the spring support has at one end a hole for a screw connection and has at the opposite end the marking.

In another advantageous embodiment, the incision of the brake caliper has a depth which is equal to the depth to which the spring support is intended to be pushed into the recess of the brake caliper during assembly.

An air brake having this spring support can advantageously be used for a utility vehicle, in particular for a heavy goods vehicle, and for a trailer vehicle.

BRIEF DESCRIPTION OF THE DRAWINGS

Embodiments of the invention are schematically illustrated in the drawings and are explained in greater detail below with reference to the Figures.

In the drawings.

DETAILED DESCRIPTION OF THE DRAWINGS

The present description illustrates the principles of the present disclosure according to the invention. It is understood that persons having skill in the art will be in a position to design various arrangements which, although not explicitly described here, embody principles of the disclosure according to the invention and are also intended to be protected within its scope.

Figure 5:
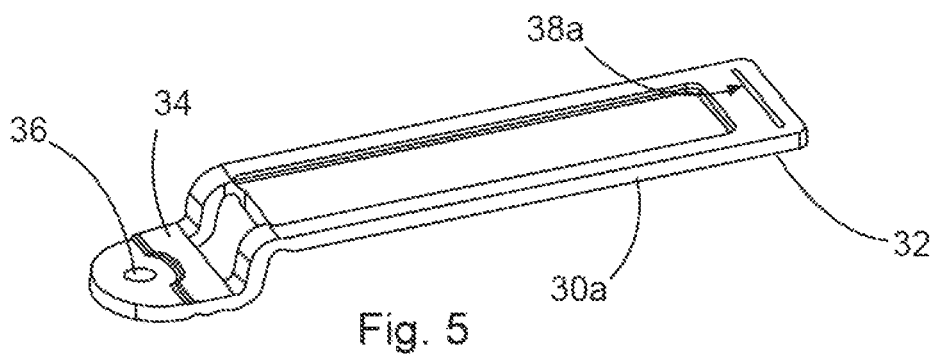
FIG. 5 shows a first embodiment of a spring support for an air brake according to an aspect of the disclosure.

In one embodiment, an air brake according to the invention contains a brake caliper and a spring support 30*a*, which, for correct assembly at an end 32 of the spring support 30*a* (the end that it is pushed into a recess of the brake caliper), has a visual indicator, such as a marking 38*a*, as illustrated in FIG. 5. In this embodiment, the marking 38*a* is in the form of an indentation or recess. The marking 38*a* indicates how deep or far the spring support 30*a* is intended to be pushed into the recess (such as recess 42 or FIG. 11 or other such recesses, like recess 22) of the brake caliper during assembly. At the opposing end 34 of the spring support 30*a*, the spring support 30*a* has a hole 36, by which the spring support 30*a* is screwed to the brake caliper during assembly of the air brake.

Figure 6:
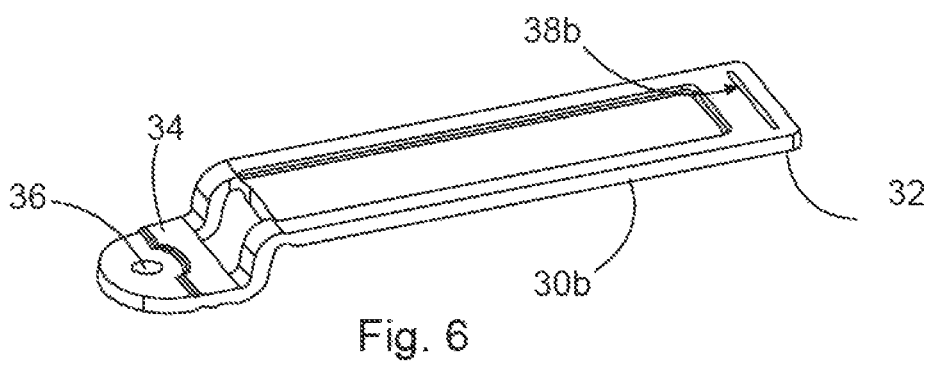
FIG. 6 shows a second embodiment of a spring support for an air brake according to an aspect of the disclosure.

In another embodiment, a spring support 30*b* has a marking 38*b* at a similar end thereof, which marking 38*b* is in the form of a sticker or a colored marking disposed on the surface of the spring support 30*b*, as illustrated in FIG. 6.

Figure 7:
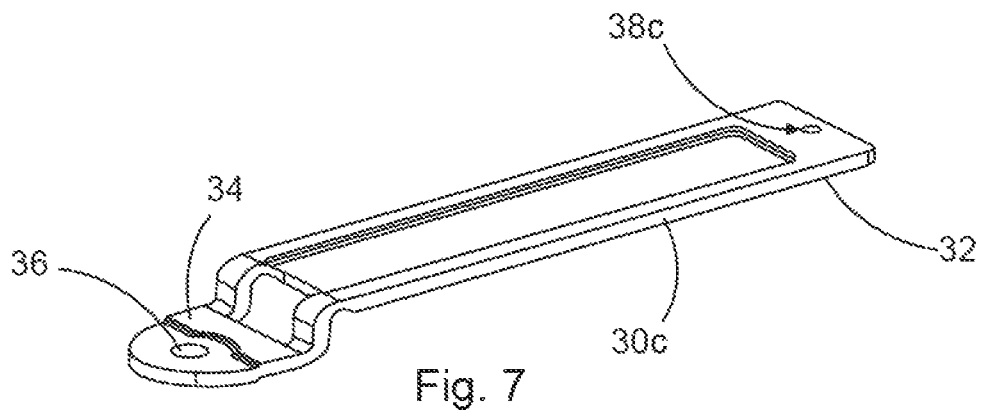
FIG. 7 shows a third embodiment of a spring support for an air brake according to an aspect of the disclosure.

In another embodiment, a spring support 30*c* has a marking 38*c* at a similar end thereof, which is in the form of a hole, as illustrated in FIG. 7. The hole is shown having a circular shape, but other shapes may be used. The marking 38*c* in the form of a hole may extend fully through the spring support 30*c*.

Figure 8:
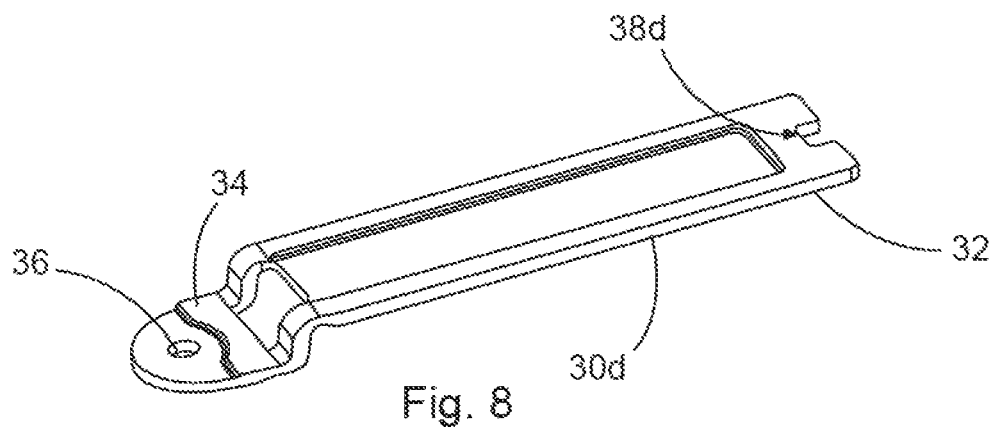
FIG. 8 shows a fourth embodiment of a spring support for an air brake according to an aspect of the disclosure.

In another preferred embodiment, a spring support 30*d* has a marking 38*d* which is in the form of an incision at the end 32 of the spring support 30*d* (the end intended to be inserted into the recess) that is opposite the end 34 with the screw connection, as illustrated in FIG. 8. The incision may extend inward into the spring support 30*d* in the direction of the opposite end such that the end 32 has a form of two projections and an intermediate space or recess therebetween.

Figure 1:
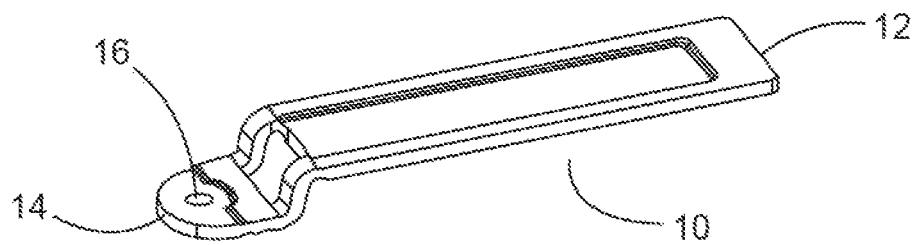
FIG. 1 shows a spring support for an air brake according to the prior art.
Figure 2:
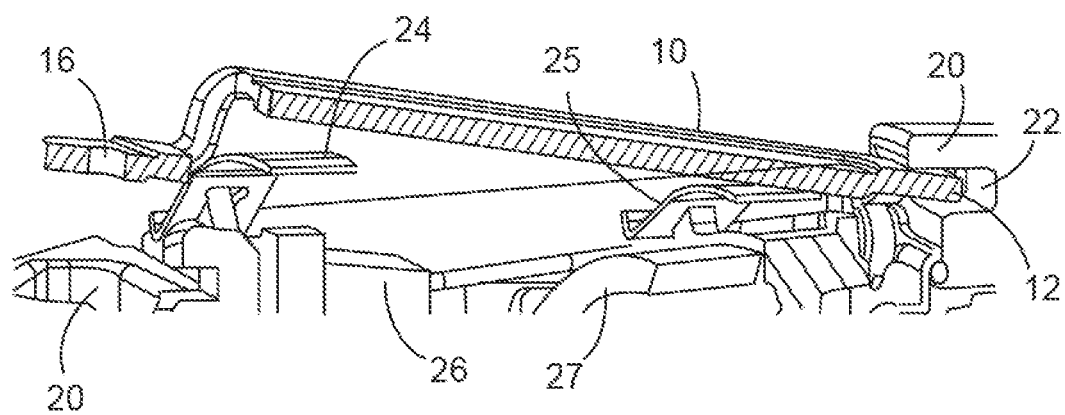
FIG. 2 shows the assembly of a spring support in a brake caliper according to the prior art.
Figure 3:
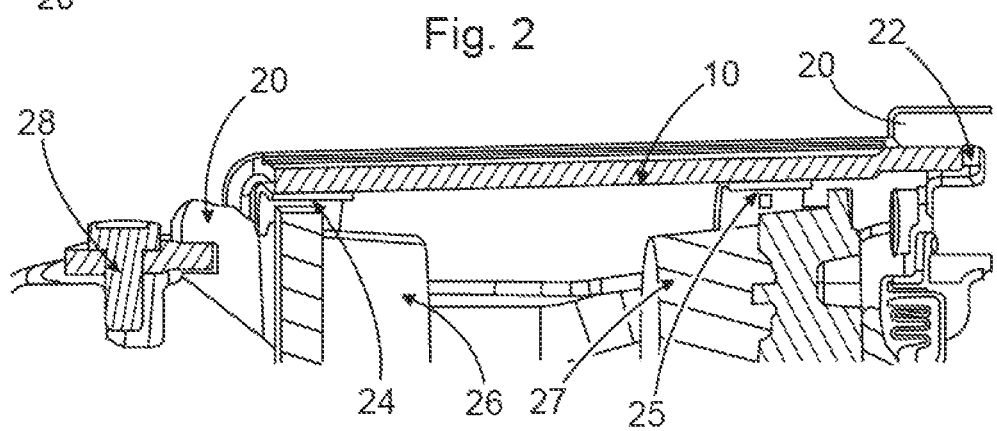
FIG. 3 shows the brake caliper of FIG. 2 with the assembled spring support.
Figure 4:
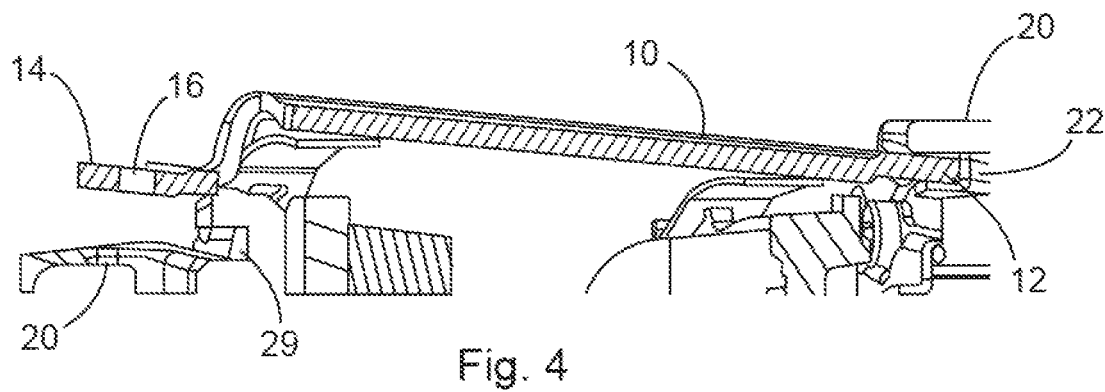
FIG. 4 shows an incorrect assembly of the spring support in the brake caliper illustrated in FIG. 2.

The positions of the markings 38*a-d* indicate, in particular, a spacing from the end 32 of the spring supports 30*a-d*, the end 32 being the end of the spring supports 30*a-d* that is intended to be pushed into the recess during assembly, and which is equal to the length by which the spring supports 30*a-d* are intended to be pushed into the recess 42. The spring supports 30*a-d* are, for example, mounted in a brake caliper 40 which may be similar to the brake caliper 20 of FIG. 2. The specific position of the markings 38*a-d* depends on the sizing and arrangement of the brake caliper 40 to which the spring support 30*a-d* is to be installed.

Figure 9:
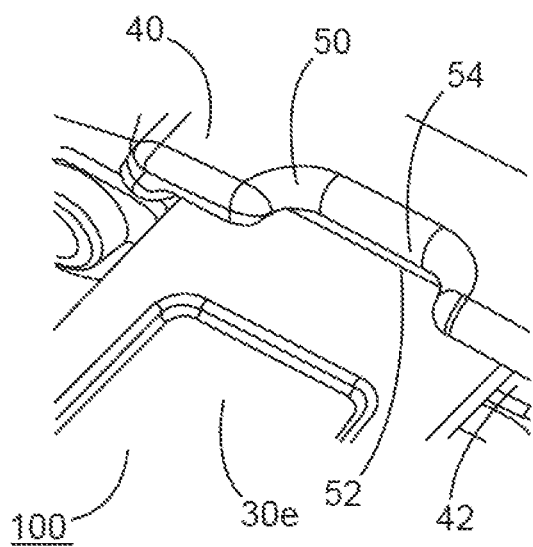
FIG. 9 shows an embodiment of a brake caliper for an air brake according to an aspect of the disclosure.
Figure 10:
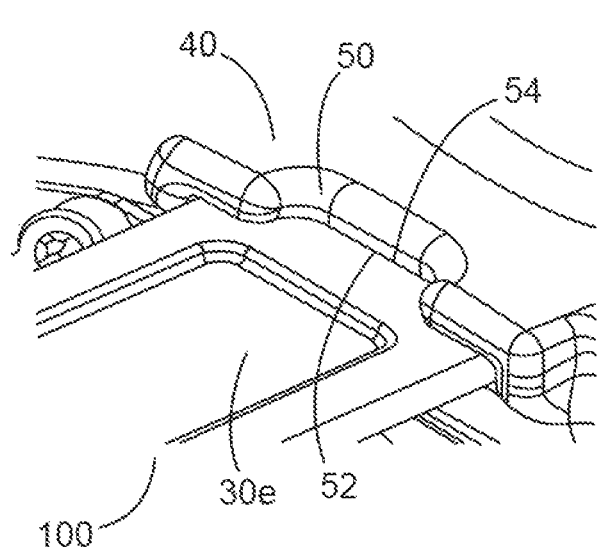
FIG. 10 shows a correct assembly of a spring support in the brake caliper of FIG. 9 according to an aspect of the disclosure.

In another embodiment, a brake caliper 41 of an air brake 100 (similar in many respects to brake caliper 40) has, above a recess 42 in which a spring support 30*e* is pushed during assembly of the air brake 100, a visual indicator or marking which is in the form of an incision 50, as illustrated in FIG. 9. The spring support 30*e* has, in this instance, no marking. The depth of the incision 50 (in the brake caliper 41 above the recess 42) is, in this instance, equal to the depth to which the spring support 30*e* is pushed into the recess 42 during correct assembly. During correct assembly of the spring support 30*e*, therefore, an edge 52 of the spring support 30*e*, which is the edge 52 of the spring support 30*e* that is pushed into the recess 42, is located precisely below an edge 54 of the incision 50, FIG. 10. The incision 50 may also be referred to as a notch.

Figure 11:
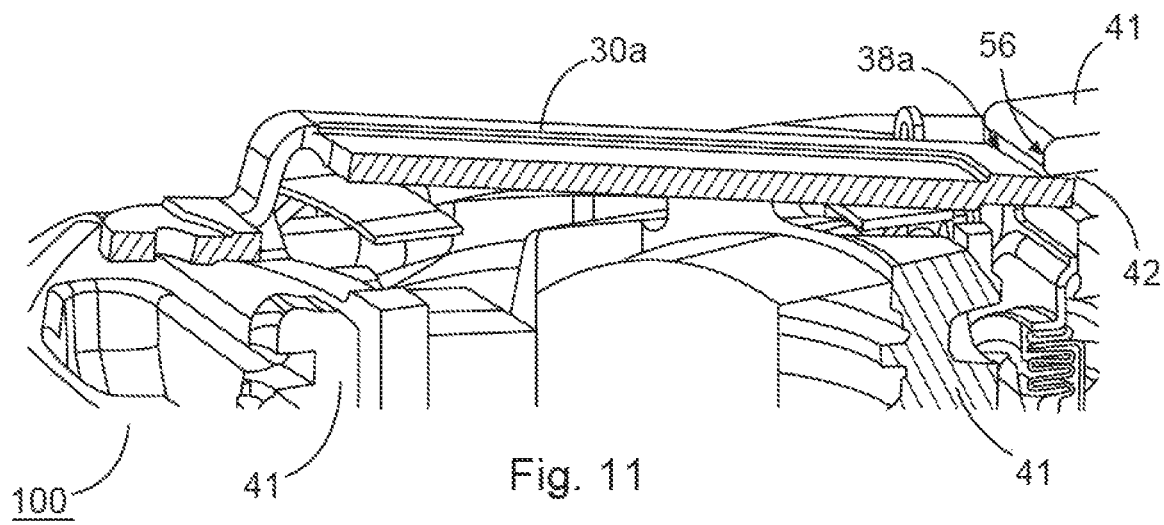
FIG. 11 shows an assembly step for assembly of a spring support in a brake caliper according to an aspect of the disclosure.
Figure 12:
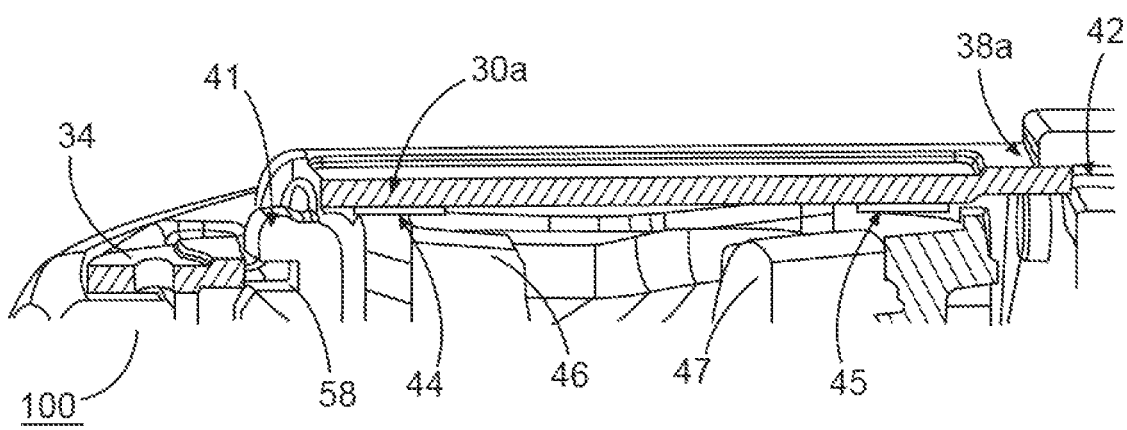
FIG. 12 shows a further assembly step for assembly of a spring support in a brake caliper according to an aspect of the disclosure.

The markings 38*a-d* of the spring supports 30*a-d* are in particular selected in such a manner that the markings 38*a-d*, in the event of correct assembly, are located aligned with an upper edge 56 of the recess 42 of the brake caliper 41, as illustrated in FIG. 11. The spring support illustrated in FIG. 11 corresponds in this instance to the spring support 30*a* which has an indentation 38*a*. It will be appreciated that the other spring supports 30*b-d* with other markings, or other such spring supports, could also be used in this illustration. It is thereby ensured that the other end 34 of the spring support 30*a* does not collide with a border 58 of the brake caliper 41, as illustrated in FIG. 12, during installation when spring support 30*a* is pivoted downward. During assembly of the air brake 100, therefore, no additional assembly steps are required for adjusting the spring support 30*a*, because the spring support 30*a* can be positioned correctly in a first assembly step with visual confirmation that the spring support 30*a* was not inserted too far. As a result of the installation of the spring support 30*a*, two leaf springs 44, 45 are pressed onto brake linings 46, 47 of the air brake 100, and are thereby positioned. The above description of the installation of the spring support 30*a* and the reliability of such installation is also applicable to the spring supports 30*b*-30*e*.

All the examples mentioned herein and conditional wordings are intended to be understood not to be limited to such specifically set out embodiments. The disclosure is therefore not limited to the embodiments described here. There is accordingly scope for various adaptations and modifications which the person skilled in the art, as a result of his technical knowledge, would consider also to belong to the disclosure.

The invention claimed is:

1. An air brake (100) comprising:
a brake caliper (40, 41),
at least one leaf spring (44, 45), and
a spring support (30*a-e*), wherein the spring support is inserted into a recess (42) of the brake caliper during assembly prior to being fixed to the brake caliper,
wherein one of the spring support (30*a-e*) or the brake caliper (40, 41) includes a visual indicator configured to align with a corresponding feature of the other of the spring support (30*a-e*) or the brake caliper (40, 41), the visual indicator configured for adjusting installation of the spring support (30*a-e*) in the brake caliper (40, 41);
wherein the spring support (30*a-d*) has at one end (34) a hole (36) for a screw connection and has at an opposite end (32) a marking (38*a-d*).

2. The air brake (100) as claimed in claim 1, wherein the visual indicator is the marking (38*a-d*), wherein the marking is in or on the spring support (30*a-d*).

3. The air brake (100) as claimed in claim 2, wherein the marking (38*c*) is in the form of a hole formed in the spring support (30*c*).

4. The air brake (100) as claimed in claim 3, wherein the hole extends fully through the spring support (30*c*).

5. The air brake (100) as claimed in claim 2, wherein the marking (38*a*) is in the form of an indentation or a recess formed in the spring support (30*a*).

6. The air brake (100) as claimed in claim 2, wherein the marking (38*b*) is in the form of a sticker or a colored marking disposed on the spring support (30*b*).

7. The air brake (100) as claimed in claim 2, wherein the marking (38*d*) is in the form of an incision or notch extending inwardly from an end (32) of the spring support (30*d*).

8. The air brake (100) as claimed in claim 2, wherein the marking (38*a-d*) has a spacing (32) from an insertion end (32) of the spring support (30*a-d*), wherein the insertion end of the spring support (30*a-d*) is inserted into the recess (42) during assembly, and wherein the spacing (32) is equal to the length by which the spring support (30*a-d*) is intended to be inserted into the recess (42) of the brake caliper (40).

9. The air brake (100) of claim 1, wherein the visual indicator is in the form of the marking (38*a-d*), wherein the marking is in or on the spring support (30*a-d*) for adjusting the spring support (30*a-d*).

10. The air brake (100) as claimed in claim 9, wherein the marking (38*a-d*) indicates how deep the spring support (30*a-e*) is intended to be inserted into the recess (42) of the brake caliper (40, 41) during assembly of the spring support (30*a-e*).

11. The air brake of claim 1, wherein the air brake is attached to a utility vehicle, in particular a heavy goods vehicle or trailer vehicle.

12. An air brake (100) comprising:
    a brake caliper (40, 41),
    at least one leaf spring (44, 45), and
    a spring support (30*a-e*), wherein the spring support is inserted into a recess (42) of the brake caliper during assembly prior to being fixed to the brake caliper,
    wherein one of the spring support (30*a-e*) or the brake caliper (40, 41) includes a visual indicator configured to align with a corresponding feature of the other of the spring support (30*a-e*) or the brake caliper (40, 41), the visual indicator configured for adjusting installation of the spring support (30*a-e*) in the brake caliper (40, 41);
    wherein the visual indicator is an incision (50) in the brake caliper (41);
    wherein the incision (50) is disposed above the recess (42) of the brake caliper (41).

13. The air brake (100) as claimed in claim 12, wherein the incision (50) of the brake caliper (41) has a depth that is equal to the depth to which the spring support (30*e*) is intended to be pushed into the recess (42) of the brake caliper (41) during assembly.

14. A brake caliper (40, 41) for a brake, the brake caliper (40, 41) comprising:
    a recess (42) defined in the brake caliper (40, 41);
    a spring support (30*a*-30*e*) having an insertion end (32) configured for insertion into the recess (42) during assembly; and
    a visual indicator associated with the brake caliper (40, 41), wherein the visual indicator is configured to align with a corresponding feature of the spring support (30*a-e*), the visual indicator configured for adjusting installation of the spring support (30*a-e*) in the brake caliper (40, 41);
    wherein the visual indicator indicates how deep the spring support (30*a-e*) is intended to be inserted into the recess (42) of the brake caliper (40, 41) during assembly of the spring support (30*a-e*);
    wherein the visual indicator is an incision (50) in the brake caliper (41);
    wherein the incision (50) is disposed above the recess (42) of the brake caliper (41).

15. The brake caliper (41) as claimed in claim 14, wherein the incision (50) of the brake caliper (41) has a depth that is equal to the depth to which the spring support (30*e*) is intended to be pushed into the recess (42) of the brake caliper (41) during assembly.

* * * * *